United States Patent [19]

Huggins et al.

[11] 4,303,622

[45] Dec. 1, 1981

[54] CHEMICAL TREATMENT OF LOW-GRADE WOLFRAMITE CONCENTRATE HAVING HIGH MO/WO$_3$ RATIO

[75] Inventors: Dale K. Huggins, Golden; Leo W. Beckstead, Arvada; Paul B. Queneau, Golden, all of Colo.

[73] Assignee: Amax Inc., Greenwich, Conn.

[21] Appl. No.: 225,908

[22] Filed: Jan. 19, 1981

[51] Int. Cl.$^3$ .................. C01G 39/00; C01G 41/00
[52] U.S. Cl. .......................... 423/55; 423/58; 423/561 R
[58] Field of Search .................. 423/53, 55, 58, 561 R

[56] References Cited

U.S. PATENT DOCUMENTS

| | | | |
|---|---|---|---|
| 2,339,888 | 1/1944 | Smith | 423/58 |
| 3,173,754 | 3/1965 | Kurtak | 423/57 |
| 3,939,245 | 2/1976 | Bellingham | 423/55 |
| 3,969,484 | 7/1976 | Onozaki et al. | 423/561 R |

Primary Examiner—Herbert T. Carter

Attorney, Agent, or Firm—Michael A. Ciomek; Eugene J. Kalil

[57] ABSTRACT

A process is disclosed for recovering tungsten and molybdenum values from tungsten concentrates containing molybdenum in an amount at least about one-twentieth of the amount of contained WO$_3$. The concentrate, generally a wolframite concentrate, is subjected to dissolution in hot NaOH solution to provide a pregnant liquor or solution containing tungsten and molybdenum values. The solution, after purification, is treated with a sulfide precipitation agent to precipitate MoS$_3$ and some WS$_3$ using a stoichiometric excess of a sulfide precipitating agent to produce a filtrate containing tungsten substantially free of molybdenum. The sulfide precipitate is dissolved in dilute NaOH solution and again precipitated using a stoichiometric deficient amount of the sulfide precipitating agent to produce a precipitate of MoS$_3$ low in tungsten. The foregoing sulfide precipitation steps may be reversed.

16 Claims, 2 Drawing Figures

CHEMICAL TREATMENT OF LOW-GRADE WOLFRAMITE CONCENTRATE HAVING HIGH MO/WO₃ RATIO

This invention relates to the caustic digestion of tungsten concentrate and, in particular, to the caustic leaching of low-grade wolframite concentrate containing molybdenum.

STATE OF THE ART

It is known to recover tungsten from its ores and especially from wolframite and scheelite concentrates. The ore is usually concentrated by gravity and flotation methods and the concentrate thereafter treated to recover tungsten therefrom as a substantially pure compound, such as ammonium paratungstate. The process generally includes the digestion of the concentrate in an alkaline solution under superatmospheric temperatures and pressures to provide a pregnant sodium tungstate solution. The pregnant tungstate solution, after separation from the insoluble solids, is treated with a water-soluble sulfide following adjustment of the pH with an acid in order to precipitate molybdenum trisulfide. The purified pregnant solution is then subjected to a liquid ion exchange treatment to load the tungstate ions on a suitable amine which is dissolved in a suitable solvent, following which the tungstate values are stripped from the loaded amine with an ammonium solution to provide an ammonium tungstate solution. The ammonium paratungstate is crystallized from the ammonium tungstate solution as a substantially pure compound.

Molybdenum and tungsten are known to occur together in certain tungsten ores. The extraction of tungsten from such ores requires the separation of these elements. The form in which the molybdenum is present can present difficulties in separating one from the other, such as by magnetic concentration and/or flotation.

In U.S. Pat. No. 2,339,888, a chemical process is disclosed for the separate recovery of molybdenum and tungsten values from ores by digestion in an alkaline solution. Following digestion, the solution is filtered to remove insolubles and the tungsten-molybdenum solution then heated to a temperature between 70° C. and its boiling point. A sulfide precipitating agent is added to the solution and the pH of the solution adjusted by adding a mineral acid to precipitate molybdenum sulfide. The solution is filtered to remove the precipitate, the pH adjusted with a base, and the tungsten recovered from the filtrate by the addition of calcium ions to form a calcium tungstate precipitate. Reference is made to a scheelite concentrate treated in this fashion containing about 58% tungsten and 2.05% molybdenum.

Certain low-grade tungsten concentrates, e.g., wolframite concentrates, containing molybdenum are known to present difficulties in the separation of tungsten from molybdenum values. By way of illustration, reference is made to a high gradient magnetically concentrated finely ground ore containing about 8% $WO_3$, about 0.5% Mo, about 25% Fe in the form of an oxide and 20% $SiO_2$, among other gangue materials. In this type of concentrate, a large portion of the molybdenum (about 90%) is associated with iron oxide gangue. A straightforward leaching and precipitation cycle as disclosed in U.S. Pat. No. 2,339,888 is not sufficient in and of itself to provide the desired separation between the tungsten values and the molybdenum values so as to provide fairly purified products of each, particularly in situations in which the leach liquor has a relatively high Mo/$WO_3$ concentration ratio.

We have observed that low-grade tungsten concentrates containing a relatively high weight ratio of Mo/$WO_3$ of about 1:20 and higher makes $MoS_3$ precipitation technology unattractive. Generally, commercial liquors contain a Mo/$WO_3$ ratio by weight of at least about 1:50. We have found that by employing a novel combination of operational steps within the known leaching and precipitating circuit, we can produce tungsten solutions substantially free of molybdenum and likewise a molybdenum product low in tungsten. We have discovered that we can achieve the foregoing by employing a two-stage $MoS_3$ precipitation technique in which the amount of sulfide precipitating agent employed is controlled in each of the precipitation stages according to the objectives to be achieved in each stage.

OBJECTS OF THE INVENTION

It is an object of the invention to provide a process for treating tungsten concentrates containing molybdenum and produce a tungsten product substantially free of molybdenum.

Another object is to provide a process for digesting low-grade tungsten concentrates containing molybdenum and separately recovering therefrom the contained tungsten and molybdenum values.

These and other objects will more clearly appear when taken in conjunction with the following disclosure, the appended claims, and the accompanying drawings.

SUMMARY OF THE INVENTION

Figure 1:
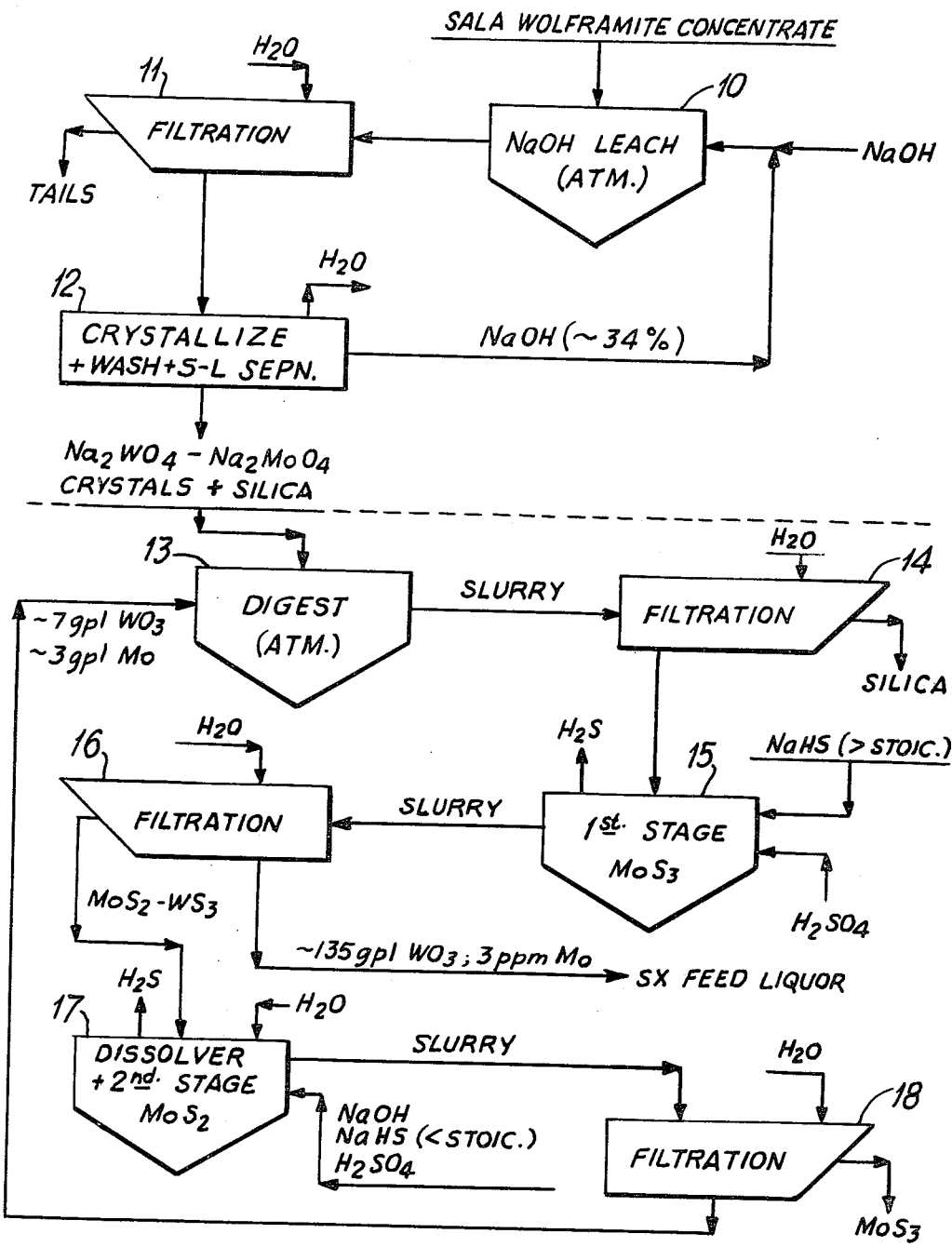
FIG. 1 is a flow sheet showing the combined leaching and precipitation process.

The invention is broadly applicable to the treatment of tungsten solutions containing molybdenum values, such as those obtained in the leaching of tungsten concentrates, e.g., low-grade wolframite concentrates.

In essence, the process employed comprises a two-step sulfide precipitation treatment comprising adding to the solution a stoichiometric excess of a sulfide precipitating agent and adjusting the pH in a first sulfide precipitation step with a non-oxidizing mineral acid to precipitate substantially all of the molybdenum and some tungsten as a sulfide and produce a filtrate containing a major portion of said tungsten for the subsequent recovery thereof. The additional steps include dissolving the sulfide precipitate in a dilute sodium hydroxide solution, adding a stoichiometric deficient amount of a sulfide precipitating agent relative to the molybdenum present and adjusting the pH as aforesaid in a second sulfide precipitation step to precipitate a major portion of the molybdenum and provide a filtrate containing residual tungsten and molybdenum.

The foregoing sulfide precipitation steps may preferably be carried out in accordance with the method disclosed in copending application Ser. No. 225,915, filed of even date herewith, the disclosure of which is incorporated herein by reference. In this method, the alkaline sodium tungstate solution of pH value above 7 is first neutralized with a non-oxidizing mineral acid to a pH value between about 7 and 5. The neutralized solution is maintained at a temperature in excess of 40° C., e.g., at least about 50° C., and a stoichiometric excess of at least one water-soluble sulfide added. The sulfided solution is then acidified through the pH range of about 5 to 4.5 as rapidly as possible to a pH value of between about 4 and about 1.5 (e.g., 2.5) to avoid time-dependent side reactions that inhibit the complete precipitation of molybdenum as molybdenum trisulfide.

The aforementioned preferred precipitation technique may be used for both steps of the process.

The solution may contain about 30 grams per liter (gpl) to 140 gpl of $WO_3$ and about $\frac{1}{2}$ gpl to 25 gpl molybdenum. Preferably, the stoichiometric excess of the sulfide precipitating agent in the first sulfide precipitation step may range from about 2 gpl to 5 gpl sulfide ion in excess of the amount required to precipitate molybdenum. The excess may also comprise about 25% to 100% above that required stoichiometrically. The stoichiometric deficient amount of the sulfide precipitating agent used in the second sulfide precipitation step may range from about 5 to 25% less than the stoichiometric amount.

The invention is particularly applicable for recovering tungsten and molybdenum values from tungsten concentrates containing molybdenum in an amount at least about one-twentieth of the amount of contained $WO_3$ by weight. One embodiment comprises subjecting the concentrate to atmospheric leaching at an elevated temperature ranging up to about 130° C. in a sodium hydroxide solution for a time sufficient to effect dissolution of at least about 75% $WO_3$ and molybdenum contained in the concentrate (e.g., about 90 to 95%) and provide a pregnant liquor containing said $WO_3$ and molybdenum values. The pregnant liquor is filtered and may be treated for the recovery of the metal values by selective sulfide precipitation; or preferably subjected to evaporative crystallization to convert the contained tungsten and molybdenum to crystals of $Na_2WO_4$-$Na_2MoO_4$ and provide a residual sodium hydroxide solution for recycle to the atmospheric leach circuit. Thereafter the crystals are dissolved by aqueous dissolution to produce a solution of said tungsten and molybdenum values, which solution is thereafter filtered of insolubles to provide a filtrate of said tungsten and molybdenum values. The pH of the filtrate is adjusted and a stoichiometric excess of a sulfide precipitating agent is employed relative to the amount of molybdenum present to precipitate substantially all of the molybdenum and some tungsten as a sulfide and produce a filtrate containing a major portion of the tungsten values substantially free from molybdenum for the subsequent recovery thereof. The rapid precipitation technique disclosed hereinbefore may be used, if desired.

The sulfide precipitate is then dissolved in a dilute sodium hydroxide solution, and a stoichiometric deficient amount of a sulfide precipitating agent added relative to the amount of molybdenum present and the pH adjusted in order to precipitate a major portion of the molybdenum and provide a filtrate containing residual tungsten and molybdenum for recycle to the first stage precipitation. The rapid precipitation technique may similarly be used in this step.

Alternatively, the two precipitation steps can be performed by using a stoichiometrically deficient amount of sulfide in the first step to produce an $MoS_3$ precipitate low in tungsten which can be further treated, if necessary. The filtrate from the first precipitation step containing substantially all of said tungsten is then treated with a stoichiometric excess of a sulfide precipitating agent so that the molybdenum is substantially completely removed from solution, with a significant amount of tungsten co-precipitated with the molybdenum, such that a substantially molybdenum-free filtrate is obtained containing tungsten. The second precipitate is dissolved in a sodium hydroxide solution and the resulting solution then returned to the main process stream somewhere upstream of the first precipitation step.

The process is particularly applicable to wolframite concentrates containing about 3% to 40% $WO_3$ and about 0.1% to 10% molybdenum, such as 3% to 15% $WO_3$ and 0.1% to 3% molybdenum. Generally speaking, the process is applicable to concentrates in which the ratio of $WO_3$ to Mo is no greater than about 10:1.

The concentration of the leaching solution may range from about 50 grams per liter (gpl) to 350 gpl sodium hydroxide and the leaching temperature range from about 40° C. to 130° C.

In order to insure substantially complete removal of molybdenum during the first sulfide precipitation step, a stoichiometric excess of a sulfide precipitating agent is added, preferably a stoichiometric excess amount such as will provide about 2 to 5 gpl S=concentration above that amount of sulfide required to precipitate the molybdenum. This allows for some tungsten to precipitate as the sulfide.

Following dissolution of the sulfide precipitate in a dilute sodium hydroxide solution, the molybdenum is recovered substantially free of tungsten in a second precipitating step by adding a sulfide precipitating agent in stoichiometric deficient amounts of, for example, about 5% to 25%. Under these conditions, the molybdenum sulfide is substantially free of tungsten. The solution remaining, which contains both tungsten and molybdenum, is recycled, preferably to the dissolution section (13, FIG. 1) of the circuit.

The dilute sodium hydroxide solution in which the first sulfide precipitate is dissolved may range in concentration from about 10 gpl to 150 gpl, the temperature ranging from about 25° C. to 110° C.

The pregnant $WO_3$ liquor may contain about 30 gpl to 140 gpl $WO_3$ and about $\frac{1}{2}$ gpl to 25 gpl Mo.

By employing a stoichiometric excess of the sulfide precipitating agent, it has been possible to obtain a $WO_3$ solution in which the $WO_3$/Mo ratio is at least about 20,000 to 1. However, 5% to 10% of the contained $WO_3$ precipitates with $MoS_3$. The dissolution of this precipitate in dilute NaOH followed by a second sulfide precipitation using stoichiometric deficient amounts of the sulfide precipitating agent (e.g., 10% deficiency) produces a clean $MoS_3$ product low in tungsten.

With regard to the previously mentioned low-grade wolframite concentrate containing about 8% $WO_3$, about 0.5% Mo, about 25% Fe, and about 20% $SiO_2$, atmospheric leaching of this concentrate at 100° C. in 260 gpl NaOH solution resulted after 16 hours of leaching in an extraction of 98+% $WO_3$ and 90+% molybdenum. The pregnant liquor generated contained about 75 gpl $WO_3$, about 5 gpl Mo, and about 1 gpl $SiO_2$.

Caustic digestion or leaching of a concentrate containing 6% $WO_3$, 0.7% Mo gave a similar result after 16 hours of leaching at 100° C. using 260 gpl NaOH at 50% solids content. The pregnant liquor contained about 75 gpl $WO_3$, about 7 gpl Mo, and about 1 gpl $SiO_2$. The caustic consumption was about 1.8 kg NaOH per kg $WO_3$. Because of the relatively low concentration of the metals in the pregnant liquor which contained 130 gpl free NaOH, the pregnant liquor was subjected to evaporative crystallization to produce $Na_2WO_4$-$Na_2MoO_4$ crystals and a more concentrated sodium hydroxide for recycle to the leach circuit.

A block diagram illustrating the total process for carrying out the invention is depicted in FIG. 1.

Referring now to FIG. 1, low-grade wolframite concentrate is subjected to atmospheric leach at 10 to which sodium hydroxide solution is fed (e.g., containing approximately 260 gpl NaOH). Following digestion as previously described, the pregnant liquor is filtered at 11, wash water being added to assure removal of entrained liquor.

The pregnant liquor is fed to crystallizer 12 where it is subjected to evaporative crystallization to form $Na_2WO_4$-$Na_2MoO_4$ crystals and a fairly concentrated sodium hydroxide solution (about 34% NaOH) which is recycled to atmospheric leach 10.

The crystals, following washing and solid-liquid separation, are fed together with the contained silica to digester or dissolution tank 13 where they are dissolved in water and recycle solution from the final $MoS_3$ stage, the digested solution being then fed as a slurry (silica) to filtration station 14 to separate out the insolubles, such as silica. Following filtration, the filtrate containing sodium tungstate and sodium molybdate is fed to the first sulfide precipitation stage 15 to which NaHS is added in stoichiometric excess amounts (e.g., 50%) and $H_2SO_4$ added to adjust the pH to a value (e.g., 2.5) conducive to the precipitation of molybdenum sulfide and some tungsten sulfide.

The $MoS_3$ precipitate together with some tungsten sulfide is sent as a slurry to filtration section 16 where the sulfide precipitate is washed and sent to dissolver section 17, the dissolver section also serving as the site for the second precipitation stage. The precipitate is dissolved in dilute sodium hydroxide and a stoichiometric deficient amount of NaHS added and the pH adjusted with the addition of $H_2SO_4$ (e.g., to 2.5) to precipitate selectively $MoS_3$ which is filtered at 18 and washed, the filtrate containing $WO_3$ and Mo (e.g., 7 gpl and 3 gpl, respectively) being recycled to the crystal dissolver at 13. The washed $MoS_3$ precipitate provides a product very low in tungsten.

Figure 2:
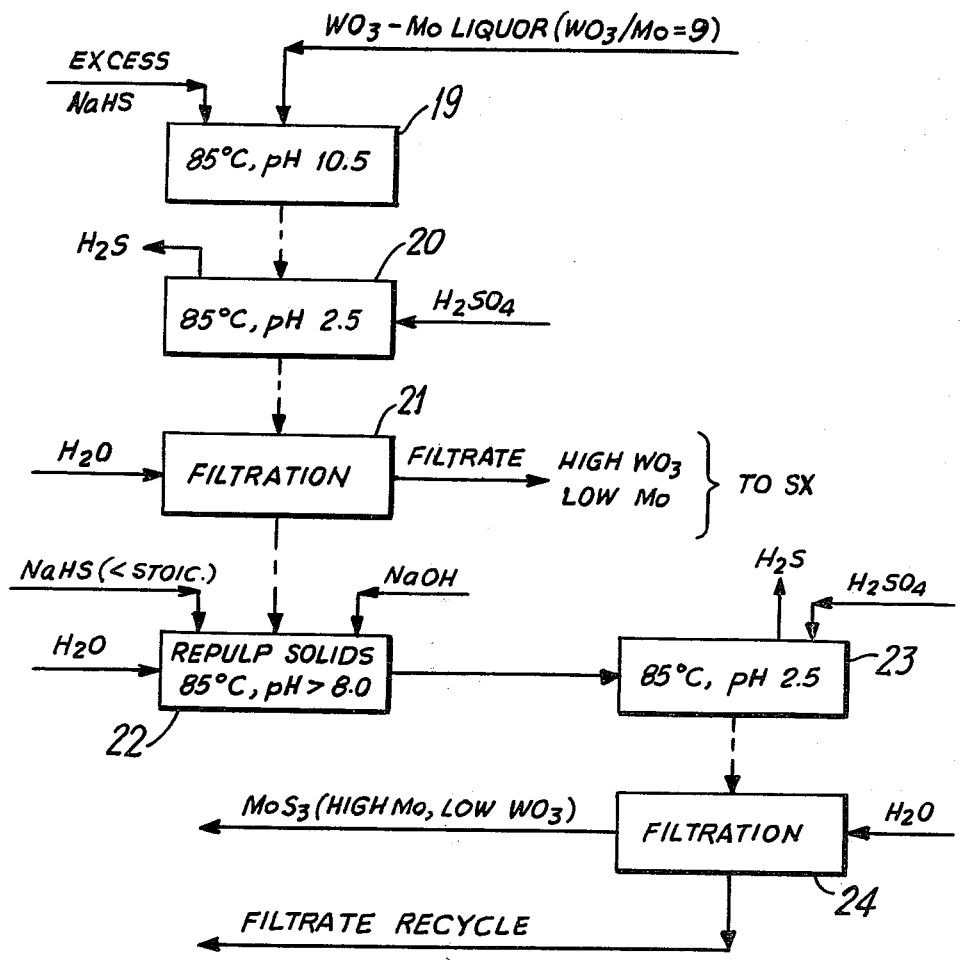
FIG. 2 depicts a flow sheet showing in greater detail the two-step molybdenum removal process.

A more detailed flow sheet of the two sulfide precipitation stages is shown in FIG. 2.

The $WO_3$-Mo liquor ($WO_3/Mo \approx 10$) is fed to 19 to which a stoichiometric excess of NaHS is added, the pH of the solution having a value of 10.5, the temperature being 85° C. The solution is acidified at 20 using $H_2SO_4$ to adjust the pH to 2.5 and effect the first stage precipitation of $MoS_3$ with some $WS_3$.

The solution with the precipitate is subjected to filtration at 21 and washed with water, the filtrate with high $WO_3$ and low Mo going to solvent extraction.

The washed sulfide precipitate from the first stage precipitation is pulped at 22 in dilute sodium hydroxide solution and dissolved at 85° C., the pH being greater than 8. NaHS is added in stoichiometric deficient amounts to the solution containing the dissolved precipitate and the solution acidified with $H_2SO_4$ at 23 to a pH value of about 2.5 to precipitate $MoS_3$ in the second precipitation stage which is filtered and washed at 24, the filtrate going to recycle in the leach circuit, the washed $MoS_3$ precipitate containing high Mo and low $WO_3$.

As illustrative of the invention, the following example is given:

EXAMPLE

A series of runs were made on a low-grade wolframite concentrate having the following composition:

TABLE I

| | & By Weight |
|---|---|
| $WO_3$ | 5.9 |
| Mo | 0.67 |
| $SiO_2$ | 17.4 |
| P | 0.24 |
| Sn | <0.01 |
| Total S | 0.96 |
| Fe | 27.7 |
| Mn | 2.5 |

The caustic leaching runs were performed in a 1-liter resin-reaction flask. The hot caustic solution was agitated at 600 RPM and the concentrate then added to start the digestion. Four runs were digested at 16 hours and four at 6 hours. The reacted slurry was filtered through a polypropylene cloth, repulped and refiltered three times using deionized water, the filter cake being given a final displacement wash. The caustic consumption was determined by titrating the pregnant filtrate to a pH value of 8, using a 1N HCl solution, the amount consumed being determined by calculation.

The treatment of the pregnant liquor was in accordance with the description given for FIGS. 1 and 2.

The results obtained are given in Tables II and III as follows:

TABLE II

| Test No. | Condition of Concentrate | Pre-Treatment Step | Leach Conditions | | | | |
|---|---|---|---|---|---|---|---|
| | | | Time (hrs) | Temp. °C. | Slurry (% Solids) | NaOH (gpl) | lb NaOH* / lb $WO_3$ |
| 1 | Dry | None | 16 | 100 | 39 | 260 | 5.5 |
| 2 | " | " | " | " | 51 | " | 3.3 |
| 3 | " | " | " | " | 41 | 160 | " |
| 4 | " | " | " | " | 29 | " | 5.5 |
| 5 | Dry | None | 6 | 100 | 41 | 160 | 5.5 |
| 6 | " | " | " | " | 39 | 260 | " |
| 7 | " | " | " | " | 51 | " | 3.3 |
| 8 | " | " | " | " | 59 | 390 | " |

*Stoichiometric lb NaOH/lb $WO_3$ = 0.345

TABLE III

| Test No. | Filtrate | | | Extraction | | NaOH Consumption |
|---|---|---|---|---|---|---|
| | $WO_3$ (gpl) | Mo (gpl) | NaOH (gpl) | $WO_3$, % | Mo, % | lb NaOH / lb $WO_3$ |
| 1 | 39 | 4.3 | 168 | 98.5 | 91.0 | 1.9 |
| 2 | 74 | 6.9 | 133 | 98.3 | 92.0 | 1.8 |
| 3 | 41 | 4.8 | 98 | 89.3 | 88.0 | 1.3 |

TABLE III-continued

| Test No. | Filtrate WO$_3$ (gpl) | Mo (gpl) | NaOH (gpl) | Extraction WO$_3$, % | Mo, % | NaOH Consumption lb NaOH lb WO$_3$ |
|---|---|---|---|---|---|---|
| 4 | 26 | 2.8 | 112 | 92.4 | 79.3 | 1.8 |
| 5 | 32 | 3.9 | 96 | 75.0 | 75.5 | 1.3 |
| 6 | 39 | 4.3 | 175 | 92.0 | 91.8 | 1.8 |
| 7 | 54 | 5.8 | 120 | 90.1 | 87.8 | 1.8 |
| 8 | 77 | 7.2 | 137 | 98.5 | — | 2.2 |

The two-stage MoS$_3$ precipitation process is particularly adapted for the treatment of low WO$_3$/Mo filtrate ratios. In the first sulfide precipitation step, the filtrate is heated to 85° C. and about 50% to 100% stoichiometric excess of the sulfide precipitation agent is added. The MoS$_3$ precipitation should result in a relatively molybdenum-free solution (e.g., WO$_3$/Mo ratio of about 20,000/1). However, about 5% to 10% of the feed WO$_3$ will precipitate as WS$_3$. As has been previously stated, this precipitate is added to dilute caustic soda at 85° C. in which it dissolves. In the second MoS$_3$ precipitation step, the addition of a 10% stoichiometric deficiency of the sulfide precipitating agent produces a substantially tungsten-free MoS$_3$ precipitate.

The liquor from the second precipitation step may be recycled to dissolve Na$_2$WO$_4$-Na$_2$MoO$_4$ crystals as shown in FIG. 1. Alternatively, the second filtrate may be returned to the first MoS$_3$ precipitation step.

In a laboratory demonstration using the procedure shown in FIG. 2, the solution treated contained 50 gpl WO$_3$ and 5.6 gpl Mo, with the pH about 11. The first precipitation resulted in a filtrate containing 45 gpl WO$_3$ and about 40 ppm Mo. The MoS$_3$ precipitate contained about 6% of the feed WO$_3$. The dissolution of the first precipitate followed by a second sulfide precipitation in accordance with the invention produced a second MoS$_3$ precipitate containing only 0.9% of the feed WO$_3$.

The effect of time and NaOH concentration will be apparent from Tables II and III. A comparison of Tests No. 1 to No. 5 shows that the longer time (16 hours) and the higher concentration of NaOH (260 gpl) favors high extraction of WO$_3$. However, high extraction can be achieved in 6 hours at 100° C. by using an NaOH concentration ranging from about 250 to 400 gpl. The caustic consumption for Test Nos. 6 to 7 at 6 hours and NaOH concentration of 260 to 390 gpl ranged from approximately 1.8 to 2.2 lbs NaOH/lb WO$_3$ (5.2 to 6.4 × stoichiometric when 98% WO$_3$ extraction was achieved). Longer leach times at lower caustic concentrations (160 gpl) resulted in less caustic consumption (1.3 lbs/lb).

With regard to the two-stage MoS$_3$ precipitation, it should be noted that an alternative method may be used other than that shown in FIGS. 1 and 2. Instead of adding excess NaHS to the first sulfide precipitating step, a deficiency could be added. The resulting MoS$_3$ would then be low in WO$_3$ content. The liquor would then be advanced to a second sulfide precipitating step where excess NaHS would be added to generate a low-Mo solvent extraction feed liquor. This method gives more immediate rejection of Mo from the leach circuit but may carry down a greater quantity of WO$_3$.

While NaHs is mentioned as the sulfide precipitating agent in the MoS$_3$ circuit, it will be appreciated that other precipitating agents may be employed. Examples of such precipitating agents are H$_2$S, Na$_2$S, NaHS or any compound which hydrolyzes to produce sulfide ion.

Although the present invention has been described in conjunction with preferred embodiments, it is to be understood that modifications and variations thereto may be resorted to without departing from the spirit and scope of the invention as those skilled in the art will readily understand. Such modifications and variations are considered to be within the purview and scope of the invention and the appended claims.

What is claimed is:

1. A process for recovering tungsten and molybdenum from a tungsten solution containing molybdenum values which comprises:
   adding to the solution an amount of a sulfide precipitating agent in stoichiometric excess of the amount of molybdenum present and adjusting the pH in a first sulfide precipitation step to precipitate substantially all of said molybdenum and some tungsten as a sulfide and produce a filtrate containing a major portion of said tungsten for the subsequent recovery thereof,
   dissolving said sulfide precipitate in a dilute sodium hydroxide solution,
   adding a stoichiometric deficient amount of a sulfide precipitating agent relative to the amount of molybdenum remaining and adjusting the pH in a second sulfide precipitation step to precipitate a major portion of said molybdenum and provide a filtrate containing residual tungsten and molybdenum.

2. The process of claim 1, wherein the solution is derived from leach liquor containing about 30 gpl to 140 gpl of WO$_3$ and about ½ gpl to 25 gpl molybdenum.

3. The process of claim 2, wherein the stoichiometric excess of the sulfide precipitating agent in the first sulfide precipitation step is about 2 gpl to 5 gpl sulfide ion in excess of the amount required to precipitate molybdenum, and wherein the stoichiometric deficient amount of the sulfide precipitating agent used in the second sulfide precipitation step ranges from about 5 to 25% less than the stoichiometric amount.

4. A process for recovering tungsten and molybdenum from a tungsten solution containing molybdenum values which comprises:
   adding to the solution an amount of a sulfide precipitating agent in a stoichiometric deficient amount relative to the amount of molybdenum present and adjusting the pH in a first sulfide precipitation step to precipitate molybdenum as a sulfide low in tungsten and produce a filtrate containing substantially all of said tungsten for the subsequent recovery thereof,
   separating the filtrate from said precipitate,
   adding a stoichiometric excess amount of a sulfide precipitating agent relative to the amount of molybdenum in the filtrate and adjusting the pH thereof to precipitate substantially all of said molybdenum and some tungsten and provide a substantially molybdenum-free filtrate containing said tungsten in a second precipitation step, dissolving said precipitate in a sodium hydroxide solution and then returning the resulting solution to the main process stream upstream of the first precipitation step.

5. The process of claim 4, wherein the solution is a pregnant leach liquor containing about 30 gpl to 140 gpl of $WO_3$ and about ½ gpl to 25 gpl molybdenum.

6. The process of claim 5, wherein the stoichiometric deficient amount of the sulfide precipitating agent used in the first sulfide precipitation step ranges from about 5 to 25% less than the stoichiometric amount and wherein the stoichiometric excess of the sulfide precipitating agent in the second sulfide precipitation step is about 2 gpl to 5 gpl sulfide ion in excess of the amount required to precipitate molybdenum.

7. A process for recovering tungsten and molybdenum values from tungsten concentrates containing at least about one-twentieth as much molybdenum as tungsten by weight which comprises:
subjecting said concentrate to atmospheric leaching at an elevated temperature ranging up to about 130° C. in a sodium hydroxide solution for a time sufficient to effect dissolution of $WO_3$ and molybdenum contained in said concentrate and provide a pregnant liquor of said $WO_3$ and molybdenum, which after filtering is subjected to selective sulfide precipitation by adding to the solution an amount of a sulfide precipitating agent in stoichiometric excess of the amount of molybdenum present and adjusting the pH in a first sulfide precipitation step to precipitate substantially all of said molybdenum and some tungsten as a sulfide and produce a filtrate containing a major portion of said tungsten for the subsequent recovery thereof,
dissolving said sulfide precipitate in a dilute sodium hydroxide solution,
adding a stoichiometric deficient amount of a sulfide precipitating agent relative to the amount of molybdenum present and adjusting the pH in a second sulfide precipitation step to precipitate a major portion of said molybdenum and provide a filtrate containing residual tungsten and molybdenum for recycle into the process.

8. The process of claim 7, wherein the tungsten concentrate is a wolframite concentrate containing about 3% to 40% $WO_3$ and about 0.1% to 10% molybdenum.

9. The process of claim 8, wherein the wolframite concentrate contains about 3% to 15% $WO_3$ and about 0.1% to 3% molybdenum.

10. The process of claim 7, wherein the atmospheric leach temperature ranges from about 40° C. to 130° C. and the concentration of the sodium hydroxide solution ranges from about 50 gpl to 350 gpl.

11. The process of claim 7, wherein the stoichiometric excess of the sulfide precipitating agent in the first sulfide precipitation is about 2 to 5 gpl sulfide ion in excess of the amount required to precipitate molybdenum, and wherein the stoichiometric deficient amount of the sulfide precipitating agent used in the second sulfide precipitation step ranges from about 5% to 25% less than the stoichiometric amount.

12. A process for recovering tungsten and molybdenum values from wolframite concentrates containing about 3% to 40% $WO_3$ and about 0.1% to 10% by weight of molybdenum which comprises:
subjecting said concentrate to atmospheric leaching at a temperature ranging from about 40° C. to 130° C. in a sodium hydroxide solution of concentration ranging from about 50 gpl to 350 gpl for a time sufficient to effect dissolution of at least about 75% $WO_3$ and molybdenum contained in said concentrate and provide a pregnant liquor of said $WO_3$ and molybdenum,
subjecting said pregnant liquor to evaporative crystallization to convert the contained tungsten and molybdenum to crystals of $Na_2WO_4$-$Na_2MoO_4$ and provide a residual sodium hydroxide solution for recycle to said atmospheric leach,
producing a solution of said tungsten and molybdenum values by the aqueous dissolution of said crystals,
said solution being thereafter filtered of insolubles to provide a filtrate of said tungsten and molybdenum values,
adding to the solution a stoichiometric excess of a sulfide precipitating agent relative to the amount of molybdenum present and adjusting the pH in a first sulfide precipitation step to precipitate substantially all of said molybdenum and some tungsten as a sulfide and produce a filtrate containing a major portion of said tungsten for the subsequent recovery thereof,
dissolving said sulfide precipitate in a dilute sodium hydroxide solution,
and adding a stoichiometric deficient amount of a sulfide precipitating agent relative to the amount of molybdenum present and adjusting the pH in a second sulfide precipitation step to precipitate a major portion of said molybdenum and provide a filtrate containing residual tungsten and molybdenum for recycle into the process.

13. The process of claim 12, wherein the wolframite concentrate contains about 3% to 15% $WO_3$ and about 0.1% to 3% molybdenum.

14. The process of claim 12, wherein the stoichiometric excess of the sulfide precipitating agent in the first sulfide precipitation step ranges from about 25% to 100%, and wherein the stoichiometric deficient amount of the sulfide precipitating agent used in the second sulfide precipitation step ranges from about 5% to 25%.

15. A process for recovering tungsten and molybdenum values from wolframite concentrates containing about 3% to 40% $WO_3$ and about 0.1% to 10% by weight of molybdenum which comprises:
subjecting said concentrate to atmospheric leaching at an elevated temperature ranging from about 40° C. to 130° C. in a sodium hydroxide solution of concentration ranging from about 50 gpl to 350 gpl for a time sufficient to effect dissolution of at least about 75% $WO_3$ and molybdenum contained in said concentrate and provide a pregnant liquor of said $WO_3$ and Mo,
subjecting said pregnant liquor to evaporative crystallization to convert the contained tungsten and molybdenum to crystals of $Na_2WO_4$-$Na_2MoO_4$ and provide a residual sodium hydroxide solution for recycle to said atmospheric leach,
producing a solution of said tungsten and molybdenum values by the aqueous dissolution of said crystals,
said solution being thereafter filtered of insolubles to provide a filtrate of said tungsten and molybdenum values,
and adding a stoichiometric excess of a sulfide precipitating agent and adjusting the pH in a first sulfide precipitation step to precipitate substantially all of said molybdenum and some tungsten as a sulfide and produce a filtrate containing a major portion of said tungsten for the subsequent recovery thereof, the stoichiometric excess of the sulfide precipitation agent ranging from about 25% to 100%, dissolving said sulfide precipitate in a dilute sodium hydroxide solution, and adding a stoichiometric deficient amount of a sulfide precipitating agent and adjusting the pH in a second sulfide precipitation step to precipitate a major portion of said molybdenum and provide a filtrate containing residual tungsten and molybdenum for recycle into the process, the stoichiometric deficient amount of sulfide precipitating agent ranging from about 5% to 25%.

16. The process of claim 15, wherein the wolframite concentrate contains by weight about 3% to 15% $WO_3$ and about 0.1% to 3% molybdenum.

* * * * *